(12) United States Patent
Im et al.

(10) Patent No.: US 8,830,302 B2
(45) Date of Patent: Sep. 9, 2014

(54) GESTURE-BASED USER INTERFACE METHOD AND APPARATUS

(75) Inventors: Soungmin Im, Seoul (KR); Sunjin Yu, Seoul (KR); Kyungyoung Lim, Seoul (KR); Sangki Kim, Seoul (KR); Yongwon Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 417 days.

(21) Appl. No.: 13/217,000

(22) Filed: Aug. 24, 2011

(65) Prior Publication Data

US 2013/0050425 A1    Feb. 28, 2013

(51) Int. Cl.
 H04N 13/02 (2006.01)
 H04N 13/00 (2006.01)
 G06F 3/00 (2006.01)
 H04N 21/4223 (2011.01)
 G06F 3/03 (2006.01)
 G06F 3/01 (2006.01)

(52) U.S. Cl.
 CPC ............ *G06F 3/005* (2013.01); *H04N 13/0296* (2013.01); *H04N 13/0207* (2013.01); *H04N 21/4223* (2013.01); *H04N 13/0271* (2013.01); *G06F 3/0304* (2013.01); *G06F 3/017* (2013.01); *H04N 13/0055* (2013.01)
 USPC .............................................. 348/46; 348/42

(58) Field of Classification Search
 None
 See application file for complete search history.

(56) References Cited

U.S. PATENT DOCUMENTS

| | | | |
|---|---|---|---|
| 2006/0038916 A1* | 2/2006 | Knoedgen et al. | 348/371 |
| 2006/0164541 A1* | 7/2006 | Olmstead et al. | 348/360 |
| 2010/0039500 A1* | 2/2010 | Bell et al. | 348/46 |
| 2010/0238262 A1* | 9/2010 | Kurtz et al. | 348/14.01 |
| 2010/0241431 A1* | 9/2010 | Weng et al. | 704/257 |
| 2011/0310376 A1* | 12/2011 | Shim et al. | 356/4.07 |
| 2012/0249741 A1* | 10/2012 | Maciocci et al. | 348/46 |
| 2012/0287244 A1* | 11/2012 | Bennett et al. | 348/46 |
| 2012/0327125 A1* | 12/2012 | Kutliroff et al. | 345/660 |

* cited by examiner

*Primary Examiner* — Joseph Ustaris
*Assistant Examiner* — Frederick Bailey
(74) *Attorney, Agent, or Firm* — Birch, Stewart, Kolasch & Birch, LLP

(57) ABSTRACT

A gesture-based user interface method and corresponding apparatus that includes a light source configured to irradiate light to a user, an image sensor configured to receive light reflected from the user and output a depth image of the user, an image processor configured to recognize a user gesture based on the depth image output from the image sensor, and a controller configured to control the light source and the image sensor such that at least one of an optical wavelength of the light source, an optical power level of the light source, a frame rate of the light source and a resolution of the depth image is adjusted according to a gesture recognition mode.

10 Claims, 13 Drawing Sheets

GESTURE-BASED USER INTERFACE METHOD AND APPARATUS

BACKGROUND OF THE INVENTION

1. Field of the Invention

The present invention relates to a gesture-based user interface method and apparatus, and more particularly, to a gesture-based user interface method and apparatus for recognizing a gesture of a user and generating a command for controlling a content display apparatus.

2. Discussion of the Related Art

A user of a content display apparatus such as a television or a personal computer (PC) operates a device such as a remote controller, a keyboard or a mouse so as to interact with a user interface. That is, in order to input a specific command to a content display apparatus, a user must operate a separate device such as a remote controller, a keyboard, a mouse or a keypad.

In order to solve inconvenience encountered when a user must operate a separate input unit so as to control an apparatus and provide a more intuitive user interface, a gesture-based user interface method and apparatus for recognizing a user gesture using a camera, converting the recognized gesture into a control command, and controlling a content display apparatus has been proposed.

However, in the gesture-based user interface apparatus of the content display apparatus, the gesture is recognized under the same conditions without considering environments and requirements for recognizing the user gesture. Accordingly, there is a need for a method of more accurately and efficiently recognizing a user gesture according to conditions such as the type of a program or content provided by a content display apparatus and the position of the user.

SUMMARY OF THE INVENTION

Accordingly, the present invention is directed to a gesture-based user interface method and apparatus that substantially obviates one or more problems due to limitations and disadvantages of the related art.

An object of the present invention is to provide a gesture-based user interface method and apparatus capable of more accurately and efficiently recognizing a user gesture according to conditions such as the type of a program or content provided by a content display apparatus and the position of the user.

Another object of the present invention is to provide a gesture-based user interface method and apparatus capable of minimizing power consumption when recognizing a user gesture.

Another object of the present invention is to provide a gesture-based user interface method and apparatus capable of minimizing capacity of data transmitted and received when recognizing a user gesture so as to more rapidly recognize the user gesture.

A further object of the present invention is to provide a gesture-based user interface method and apparatus capable of more accurately recognizing a user gesture using two or more camera devices.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a gesture-based user interface apparatus includes a light source configured to irradiate light to a user, an image sensor configured to receive light reflected from the user and output a depth image of the user, an image processor configured to recognize a user gesture based on the depth image output from the image sensor, and a controller configured to control the light source and the image sensor such that at least one of an optical wavelength of the light source, an optical power level of the light source, a frame rate of the light source and a resolution of the depth image is adjusted according to a gesture recognition mode.

The gesture recognition mode may include a first mode for recognizing a whole-body gesture and a second mode for recognizing a gesture involving only a part of the body, and the recognition range of the second mode may be narrower than that of the first mode.

The controller may control the light source such that the optical wavelength is set to a first wavelength in the first mode and the optical wavelength is set to a second wavelength shorter than the first wavelength in the second mode.

The controller may control the light source such that the frame rate is set to a first frame rate in the first mode and the frame rate is set to a second frame rate greater than the first frame rate in the second mode.

The controller may control the image sensor such that the resolution of the depth image is set to a first resolution in the first mode and the resolution of the depth image is set to a second resolution higher than the first resolution in the second mode.

The gesture recognition mode may include a short distance mode in which a distance between the gesture-based user interface apparatus and the user is less than a reference distance and a long distance mode in which the distance is greater than the reference signal. At this time, the controller may set an optical power level to a first power value in the short distance mode and set the optical power level to a second power value greater than the first power value in the long distance mode.

The interface apparatus may further include a gesture-based gesture recognition information memory configured to store a reference image for recognizing the user gesture and information regarding a command for a user interface corresponding to the recognized user gesture, and the image processor may output a command corresponding to the user gesture based on the reference image and the information regarding the command.

In another aspect of the present invention, a gesture-based user interface apparatus includes a first depth camera and a second depth camera, each of which includes a light source for irradiating light to a user and an image sensor for receiving light reflected from the user, converting the light into an electrical image signal and outputting the electrical image signal, an image processor configured to recognize a user gesture based on the electrical image signal output from the image sensor, and a controller configured to select at least one camera to be used from among the first depth camera and the second depth camera according to a gesture recognition mode of the user.

The first depth camera may be a zoom camera for accurately photographing the user and the second depth camera may be a wide angle camera for photographing a region wider than that of the first depth camera.

The first depth camera and the second depth camera may be set to photograph gestures of different users.

The first depth camera may be disposed to provide a front image of the user and the second depth camera may be disposed to provide a side image of the user.

The first depth camera may be a time of flight (TOF) type camera and the second depth camera may be a structured light type camera.

In another aspect of the present invention, a gesture-based user interface method includes determining a gesture recognition mode of a user, adjusting at least one of an optical wavelength, an optical power level, a frame rate and a resolution of a depth image of the user according to the gesture recognition mode, irradiating light to the user, and receiving light reflected from the user, converting the light into the depth image and outputting the depth image.

In another aspect of the present invention, a gesture-based user interface method includes determining a gesture recognition mode of a user, selecting at least one camera to be used from among a first depth camera and a second depth camera according to the gesture recognition mode, irradiating light to the user using the selected at least one camera, and receiving light reflected from the user, converting the light into a depth image and outputting the depth image.

In another aspect of the present invention, there is an apparatus configured to recognize a user gesture. The apparatus includes: a camera system that includes a electromagnetic wave source configured to irradiate electromagnetic waves; and an image sensor configured to receive a portion of the irradiated electromagnetic waves that is reflected from a user, convert the received electromagnetic waves into an electrical signal, and output the electrical signal; and a controller operatively connected to the camera system, the controller configured to select at least one of a first field of view and a second field of view of the camera system according to a gesture recognition mode of the apparatus, the second field of view being wider than the first field of view.

In another aspect of the present invention, there is method of recognizing a user gesture by an apparatus having a light source and an image sensor. The method includes: controlling an operation of the apparatus according to a gesture recognition mode of the apparatus, the gesture recognition mode including settings for controlling at least one of an optical wavelength of the light source, an optical power level of the light source, a frame rate of the light source and an image resolution of the image sensor The operation of the apparatus includes irradiating light by the light source; receiving a portion of the light that is reflected from a user; converting the received light into a depth image of the user by the image sensor; and outputting the depth image.

In another aspect of the present invention, there is a method of recognizing a user gesture by an apparatus including a camera system. The method includes: selecting a field of view of the camera system according to a gesture recognition mode of the apparatus, the selected field of view being one of a first field of view and a second field of view, the second field of view being wider than the first field of view; irradiating electromagnetic waves from the apparatus; receiving, by the camera system according to the selected field of view, a portion of the irradiated electromagnetic waves that is reflected from a user; converting the received electromagnetic waves into an electrical signal; and outputting the electrical signal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
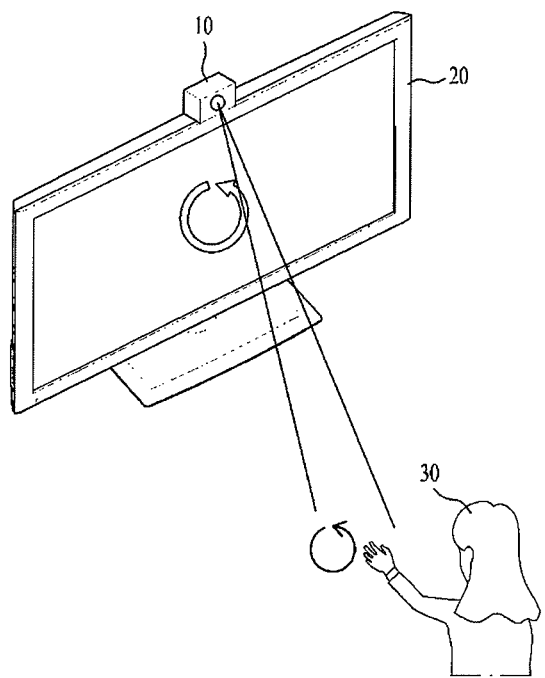
FIG. 1 is a schematic diagram showing an example of using a gesture-based user interface apparatus according to a first embodiment of the present invention.

Reference will now be made in detail to the preferred embodiments of the present invention, examples of which are illustrated in the accompanying drawings. FIG. 1 is a schematic diagram showing an example of using a gesture-based user interface apparatus (hereinafter, referred to as an interface apparatus) according to a first embodiment of the present invention.

As shown in FIG. 1, the interface apparatus 10 according to the present invention is connected to a content display apparatus 20 and is positioned so as to capture a user gesture. The interface apparatus 10 recognizes the gesture from the image of the user, converts the gesture into a command for controlling the content display apparatus 20, and enables the content display apparatus to perform a function desired by the user 30.

Figure 2:
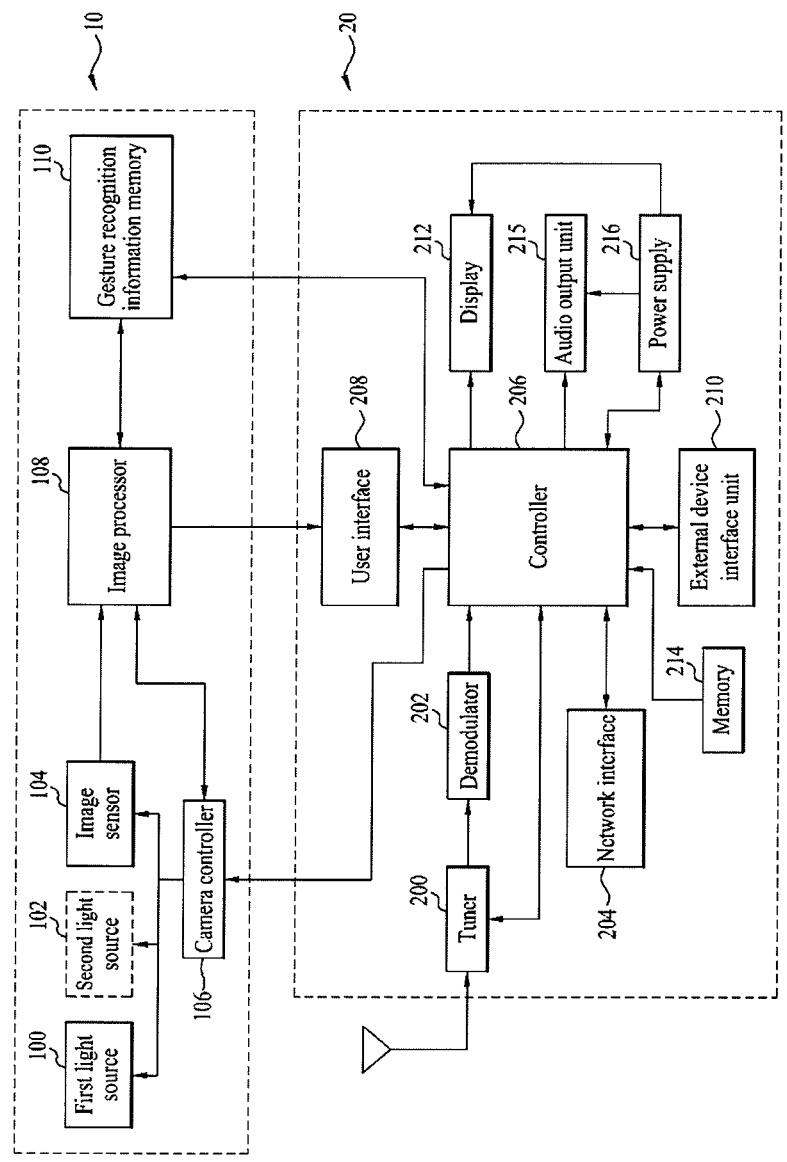
FIG. 2 is a block diagram of a gesture-based user interface apparatus and a content display apparatus according to the first embodiment of the present invention.

FIG. 2 is a block diagram of the gesture-based user interface apparatus 10 and the content display apparatus 20 according to the first embodiment of the present invention.

Hereinafter, the configuration example of the interface apparatus 10 and the content display apparatus 20 will be described in detail with reference to FIG. 2.

The interface apparatus 10 includes a first light source 100, an image sensor 104, a camera controller 106, an image processor 108, and a gesture recognition information memory 110. Optionally, the interface apparatus 10 may include a second light source 102 having characteristics different from those of the first light source 100.

The first and second light sources 100 and 102 irradiate light to the user in order to acquire the image of the user. The first and second light sources 100 and 102 may include infrared light (IR) light sources. The first and second light sources 100 and 102 may have different wavelengths. For example, the first light source 100 may be an IR light source having a wavelength of 780 nm and the second light source 102 may be an IR light source having a wavelength of 850 nm, which is longer than that of the first light source 100.

Figure 3:
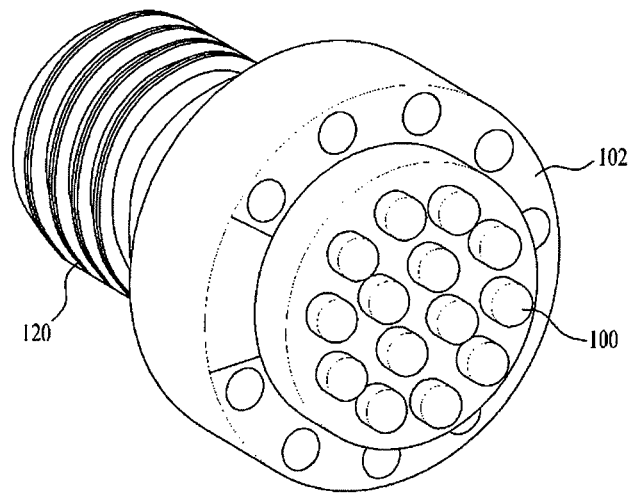
FIG. 3 is a perspective view showing an example of a light source unit of the gesture-based user interface apparatus according to the first embodiment of the present invention.

FIG. 3 is a perspective view showing an example of a light source unit of the gesture-based user interface apparatus 10 according to the first embodiment of the present invention. As shown in FIG. 3, the light source unit may include first light sources 100 disposed on a central portion thereof and second light sources 102 arranged to surround the first light sources 100. The first light sources 100 and the second light sources 102 may have different characteristics in terms of wavelength, an optical power level, frame rate, etc.

The image sensor 104 receives the light reflected from the user and generates and outputs a depth image of the user. In the present invention, the depth image may be generated using a time of flight (TOF) method or a structured light method.

In the TOF method, distance information between the user and the image sensor 104 is acquired from a phase difference between light emitted from the light source and the light reflected from the user.

In the structured light method, infrared ray patterns (numerous infrared ray points) are emitted from the light source, the emitted patterns are reflected from the user, the reflected patterns are captured by the image sensor 104 including a filter, and the distance information between the user and the image sensor is acquired based on distortion of the patterns. In the structured light method, a separate processor is necessary in addition to the image sensor 104, in order to acquire a depth image. Accordingly, the interface apparatus 10 according to the present invention may further include an additional processor for generating a depth image from the light received by the image sensor 104.

The image sensor 104 may include, for example, a complementary metal oxide semiconductor (CMOS) sensor or a charge coupled device (CCD) sensor.

The image processor 108 recognizes the user gesture based on the depth image output from the image sensor 104. For example, the image processor 108 detects at least one object having a peak value from a first depth image acquired by the image sensor 104. In order to detect the peak value, various methods may be used.

More specifically, the image processor 108 may compute a mean m and an average absolute deviation σ of pixel values in the depth image. A median and an average absolute deviation from the median may be used as the mean and the average absolute deviation.

The image processor 108 may generate a binary image having the same size, in which a value of 1 is allocated to all pixels having a depth value higher than a threshold (m+Kσ) and a value of 0 is allocated to the other pixels. K may vary according to noise levels and the number of objects displayed in the image. In the binary image, connected components may be identified as one object and a unique ID may be applied thereto.

Similarly, the image processor 108 detects at least one object having a peak value from a second depth image. The image processor 108 compares the coordinate of at least one object extracted from the second depth image with the coordinate of at least one object extracted from the first depth image and sets at least one object having a changed coordinate as a target object.

By comparing the two depth images, a mobile object is set as a target object and a stationary object is not set as a target object. Accordingly, the image processor 108 may distinguish between a body part such as a hand of the mobile user and a stationary object and set the hand of the mobile user as a target object.

At least one object set as the target object may be used as an input unit of the user interface. For example, the user may input a gesture using the target object and the image processor 108 analyzes the input gesture and outputs a command according to the result of the analysis.

That is, if the user moves a body part set as a target object, the movement of the body part may be photographed using the light source and the image sensor 104, the photographed depth image may be analyzed, and a pointer displayed on the content display apparatus 20 may be moved. In addition to the movement of the pointer, various functions of the content display apparatus, such as channel up/down or volume up/down may be performed.

At this time, a command table in which gestures of a specific user are mapped to commands corresponding thereto may be stored in the gesture recognition information memory 110. The image processor 108 may output a command corresponding to the user gesture to the content display apparatus 20 based on the command table stored in the gesture recognition information memory 110. At this time, a mapping relationship between the command defined in the command table and the gesture may be arbitrarily set by the user.

Although the image processor 108 and the gesture recognition information memory 110 are shown as components belonging to the interface apparatus 10 of the present embodiment in FIG. 2, the image processor 108 and the gesture recognition information memory 110 may be included in the content display apparatus 20 such as the television or the PC so as to perform the same function.

The camera controller 106 controls the light source and the image sensor 104 so as to control at least one of an optical wavelength of the light source, an optical power level of the light source, a frame rate of the light source and resolution of the depth image according to a gesture recognition mode.

The gesture recognition mode may be divided into a first mode for recognizing a whole-body gesture and a second mode for recognizing a gesture involving only a part of the body. The recognition range of the second mode is narrower than that of the first mode.

Figure 4:
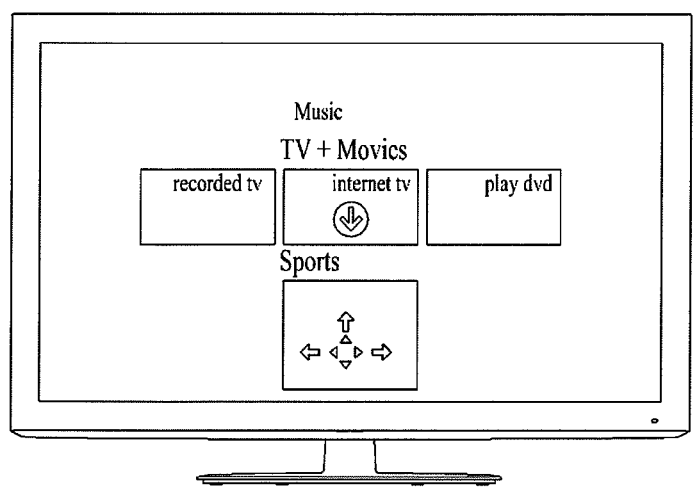
FIGS. 4 and 5 are schematic diagrams showing a user operation in a first mode.
Figure 5:

For example, as shown in FIG. 4, if content which is being reproduced by the content display apparatus 20, such as TV broadcasts, movies or e-books, does not require a complicated operation in terms of control, the gesture recognition mode may be set to the first mode. Since the first mode requires relatively simple control such as page turning, channel change or volume change, as shown in FIG. 5, the user may control the content display apparatus 20 using a relatively large gesture in the first mode.

Figure 6:
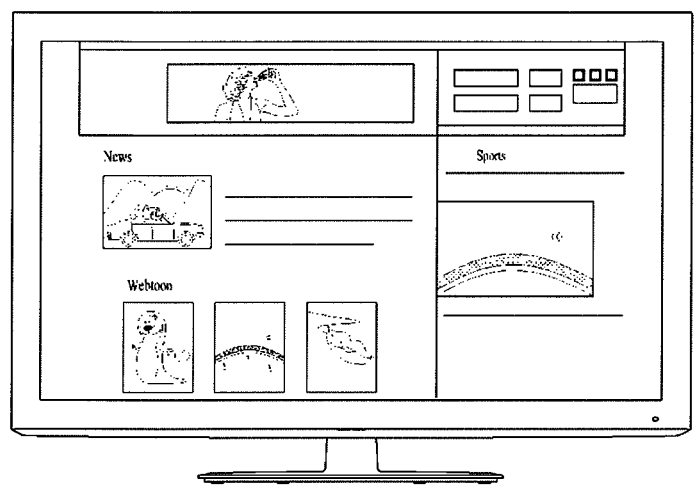
FIGS. 6 and 7 are schematic diagrams showing a user operation in a second mode.
Figure 7:
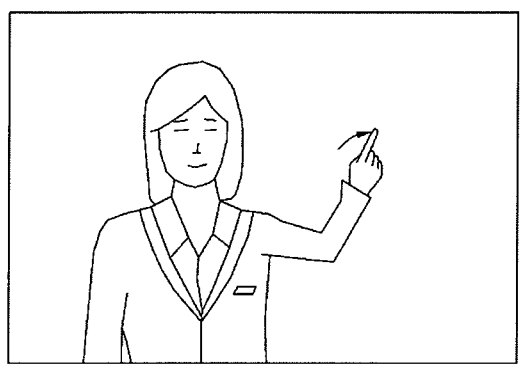

As shown in FIG. 6, if content which is being reproduced by the content display apparatus 20, such as html documents used in a PC or games, requires an accurate operation in terms of control, the gesture recognition mode may be set to the second mode. Since the second mode requires complicated commands such as selection, clicking and copying of a displayed object such as a text, as shown in FIG. 6, the user can control the content display apparatus 20 using a relatively small gesture such as movement of a finger in the second mode.

The user makes a control intention using a specific gesture to the content display apparatus 20. The user may acquire control rights to the gesture-based user interface. At this time, the first mode is used until the user acquires control rights, the user gains the right to control the content display apparatus 20 based upon the control rights, and the second mode is set once the control rights expire.

The camera controller 106 may receive information regarding the type of a program or content which is being reproduced from a controller 206 of the content display apparatus 20 and set the gesture recognition mode to the first mode or the second mode. The camera controller 106 may distinguish 3 or more gesture recognition modes according to characteristics of the content.

In the set gesture recognition modes, the camera controller 106 may control the light source so as to set an optical wavelength to a first wavelength in the first mode and to set an optical wavelength to a second wavelength shorter than the first wavelength in the second mode requiring accurate gesture recognition.

For example, the camera controller 106 may control the second light source 102 having a wavelength of 850 nm to be used to acquire a depth image in the first mode which does not require accurate gesture recognition. In this case, by using the second light source 102 having the wavelength longer than that of the first light source 101, it is possible to reduce energy consumption. In contrast, the camera controller 106 may control the first light source 100 having a wavelength of 780 nm to be used to acquire a more accurate depth image in the second mode requiring accurate gesture recognition.

The camera controller 106 may control the light source such that the frame rate is set to a first frame rate in the first mode and the frame rate is set to a second frame rate greater than the first frame rate in the second mode. For example, the camera controller 106 may control the light source to irradiate light at a frame rate of 15 fps so as to acquire a depth image in the first mode which does not require accurate gesture recognition. In contrast, the camera controller 106 may control the light source to irradiate light at a frame rate of 60 fps so as to acquire a more accurate depth image in the second mode which requires accurate gesture recognition.

The camera controller 106 may control the image sensor 104 such that the resolution of the depth image is set to a first resolution in the first mode and is set to a second resolution higher than the first resolution in the second mode. In the first mode, the gesture can be more rapidly recognized by reducing the output data amount of the depth image.

Figure 8:
FIGS. 8 to 10 are diagrams showing depth images having different resolutions.
Figure 9:
Figure 10:
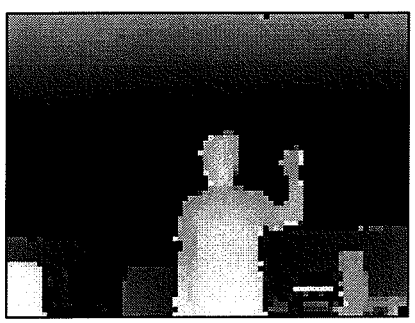

FIGS. 8 to 10 show examples of depth images having different resolutions. FIG. 8 shows a depth image having a VGA resolution (640×480), FIG. 9 shows a depth image having a QVGA resolution (320×240), and FIG. 10 shows a depth image having a QQVGA resolution (160×120).

For example, the camera controller 106 may control the image sensor 104 to output a depth image having a low resolution of QQVGA (160×120) to the image processor 108 as shown in FIG. 10 in the first mode which does not require accurate gesture recognition. In contrast, the camera controller 106 may control the image sensor 104 to output a depth image having a high resolution of VGA (640×480) as shown in FIG. 8 in the second mode requiring accurate gesture recognition. If the gesture recognition mode is divided into three modes according to program characteristics, it is possible to respectively set resolutions according to the modes.

The camera controller 106 may divide the gesture recognition mode into a short distance mode indicating that a distance between the interface apparatus 10 and the user is less than a reference distance and a long distance mode indicating that the distance between the interface apparatus 10 and the user is greater than the reference distance.

Figure 11:
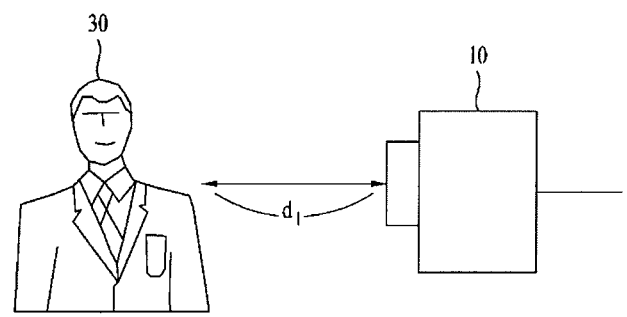
FIG. 11 is a schematic diagram showing a positional relationship between a user and a camera in a short distance mode.
Figure 12:
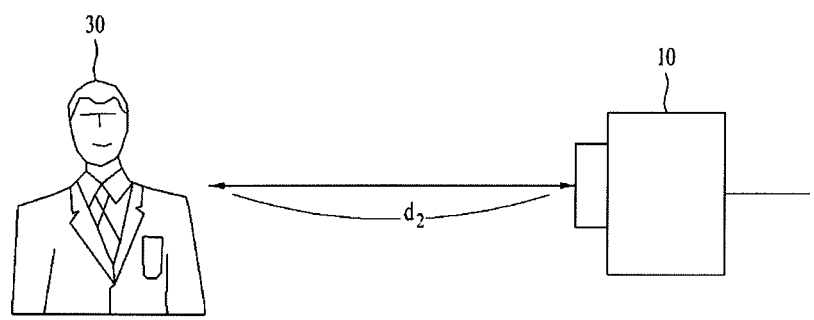
FIG. 12 is a schematic diagram showing a positional relationship between a user and a camera in a long distance mode.

FIG. 11 is a schematic diagram showing a positional relationship between a user and a camera in a short distance mode, and FIG. 12 is a schematic diagram showing a positional relationship between a user and a camera in a long distance mode.

If the user 30 is separated from the interface apparatus 10 by a relatively short distance $d_1$ as shown in FIG. 11, the camera controller 106 sets the gesture recognition mode to the short distance mode and, if the user 30 is separated from the interface apparatus 10 by a relatively long distance $d_2$ as shown in FIG. 12, the camera controller 106 sets the gesture recognition mode to the long distance mode.

The camera controller 106 may set an optical power level to a first power value in the short distance mode and set the optical power level to a second power value greater than the first power value in the long distance mode. In the short distance mode, the light source is set to have a relatively low power level so as to reduce power consumption. In contrast, in the long distance mode, the light source is set to have a relatively high power level so as to increase the recognition rate of the user gesture.

For example, the camera controller 106 sets the power level of the light source to 200 Lux in the short distance mode and sets the power level of the light source to 800 Lux in the long distance mode, thereby increasing a recognizable distance.

The content display apparatus 20 to which the above-described interface apparatus 10 is applied includes all apparatuses for reproducing multimedia content, such as a digital television or a PC. In the present embodiment, a digital television is shown as an example of the content display apparatus 20.

Accordingly, the content display apparatus 20 includes a tuner 200, a demodulator 202, an external device interface 210, a network interface 204, a memory 214, a user interface 208, a controller 206, a display 212, an audio output unit 215 and a power supply 216.

The tuner 200 a) tunes to a Radio Frequency (RF) broadcast signal corresponding to a channel selected by a user or a channel stored in advance from among RF broadcast signals received through an antenna, and b) converts the tuned RF broadcast signal into an Intermediate Frequency (IF) signal or a baseband video or audio signal.

The tuner 200 may receive an RF broadcast signal of a single carrier according to an Advanced Television System Committee (ATSC) scheme and an RF broadcast signal of multiple carriers according to a Digital Video Broadcasting (DVB) scheme.

The tuner 200 may sequentially tune to RF broadcast signals of all broadcast channels stored through a channel storage function from among the received RF broadcast signals and convert the tuned RF broadcast signals into IF signals or baseband video or audio signals.

The demodulator 202 receives a digital IF (DIF) signal converted by the tuner 200 and demodulates the DIF signal.

For example, if the DIF signal output from the tuner 200 is based on an ATSC scheme, the demodulator 202 performs 8-vestigial side band demodulation 8-VSB. The demodulator 202 may perform channel decoding. In order to perform channel decoding, the demodulator 202 includes a trellis decoder, a de-interleaver and a Reed-Solomon decoder so as to perform trellis decoding, de-interleaving and Reed-Solomon decoding.

The demodulator 202 may perform demodulation and channel decoding and output a transport stream (TS). At this time, the TS may be a signal in which a video signal, an audio signal and a data signal are multiplexed. By way of example, the TS will be assumed to be an MPEG-2 TS in which an MPEG-2 video signal and a Dolby AC-3 audio signal are multiplexed. More specifically, the MPEG-2 TS may include a 4-byte header and a 184-byte payload.

The demodulator 202 may include an ATSC demodulator and a DVB demodulator.

The TS output from the demodulator 202 is input to the controller 206. The controller 206 performs demultiplexing, video/audio signal processing, etc., outputs video to the display 212, and outputs audio to an audio output unit 215.

The external device interface 210 is configured to transmit or receive data to or from an external device. The external device interface 210 may include an A/V input/output unit (not shown) and a wireless communication unit (not shown).

For example, the external device interface 210 may be connected to an external device such as a Digital Versatile Disc (DVD), Blu-ray, game console, camcorders, or (laptop) computers in a wired/wireless manner. The external device interface 210 sends a video, audio or data signal received from the connected external device to the controller 206 of the content display apparatus 20. In addition, the external device interface 210 may output the video, audio or data signal processed by the controller 206 to the connected external device. The external device interface 210 may include an A/V input/output unit (not shown) or a wireless communication unit (not shown).

At this time, the A/V input/output unit inputs the video signal and the audio signal of the external device to the display apparatus 20 and may include a Universal Serial Bus (USB) port, a Composite Video Banking Sync (CVBS) terminal, a component terminal, an S-video terminal (analog), a Digital Visual Interface (DVI) terminal, a High Definition Multimedia Interface (HDMI) terminal, an RGB terminal, and a D-SUB terminal.

In addition, the external device interface 210 may be connected to various set-top boxes through at least one of the above-described various terminals so as to perform an input/output operation with the set-top boxes. The external device interface 210 may transmit or receive data to or from a supplementary 3D display.

The network interface 204 provides an interface for connecting the content display apparatus 20 to a wired/wireless network including an Internet network. The network interface 204 may include an Ethernet port, for connection with a wired network. For connection with a wireless network, a communication standard such as Wireless LAN (WLAN) (Wi-Fi), Wireless Broadband (WiBro), World Interoperability for Microwave Access (Wimax), or High Speed Downlink Packet Access (HSDPA) may be used.

The network interface 204 is configured to receive content or data provided by an Internet or content provider or a network manager over a network. That is, the network interface 204 may receive content such as movies, advertisements, games, VOD, or broadcast signals and information associated therewith provided by the content provider. In addition, the network interface 204 may receive update information and firmware updates provided by the network manager. In addition, the network interface 204 may transmit data to the Internet or content provider or the network manager.

In addition, the network interface 204 is connected to, for example, an Internet Protocol TV (IPTV) so as to receive and transmit a video, audio or data signal processed by a set-top box for IPTV to the controller 206, and to transmit signals processed by the controller 206 to the set-top box for IPTV, in order to perform bidirectional communication.

The IPTV may include an ADSL-TV, VDSL-TV, FFTH-TV or the like according to the type of transmission network or include TV over DSL, Video over DSL, TV over IP (TVoIP), Broadband TV (BTV), or the like. In addition, the IPTV may include an Internet TV capable of Internet access or a full-browsing TV.

The memory 214 may store a program in the controller 206 for performing signal processing and control and store a processed video, audio or data signal.

In addition, the memory 214 may perform a function for temporarily storing a video, audio or data signal input through the external device interface 210. In addition, the memory 214 may store information about predetermined broadcast channels through a channel storage function such as a channel map.

The memory 214 may include at least one of a flash memory type storage medium, a hard disk type storage medium, a multimedia card micro type medium, a card type memory (e.g., SD memory, XD memory, or the like), a RAM, or a ROM (EEPROM or the like). The content display apparatus 20 may reproduce and provide a file (a moving image file, a still image file, a music file, a document file, or the like) stored in the memory 214 to the user.

Although FIG. 2 shows an embodiment in which the memory 214 is included separately from the controller 206, the present invention is not limited thereto and the memory 214 may be included in the controller 206.

The user interface 208 sends a signal input by the user to the controller 206 through a gesture or sends a signal from the controller 206 to the user.

For example, the user interface 208 may receive a user input signal, such as power on/off, channel selection or screen setup, from the interface apparatus 10 or transmit a control signal from the controller 206 to the interface apparatus 10 or 210.

In addition, for example, the user interface 208 may send a user input signal input through a local key (not shown) such as a power key, a channel key, a volume key, or a setup value to the controller 206.

In addition, for example, the user interface 208 may receive a signal input by the user using various methods and send the signal to the controller 206 or receive a signal from the controller 206. The user interface 208 may receive the signal input by the user using a remote controller, a touch sensor, a voice sensor or the like.

The controller 206 may demultiplex the TS input through the tuner 200, the demodulator 202 or the external device interface 210 or process the demultiplexed signals, and generate and output signals for a video or audio output.

The video signal processed by the controller 206 may be input to the display 212 such that a video corresponding to the video signal is displayed. The video signal processed by the controller 206 may be input to an external output device through the external device interface 210.

The audio signal processed by the controller 206 may be audibly output through the audio output unit 215. In addition, the audio signal processed by the controller 206 may be input to an external output device through the external device interface 210.

The controller 206 may control the overall operation of the content display apparatus 20. For example, the controller 206 may control the tuner 200 so as to tune to an RF broadcast corresponding to a channel selected by the user or a channel stored in advance.

In addition, the controller 206 may control the content display apparatus 20 according to a user command input through the user interface 208 or an internal program.

For example, the controller 206 controls the tuner 200 such that the signal of a channel selected according to a predetermined channel selection command received through the user interface 208 is input. The video, audio or data signal of the selected channel is processed. The controller 206 may output information about the channel selected by the user through the display 212 or the audio output unit 215 together with the video or audio signal.

As another example, the controller 206 may control a video or audio signal received from an external device, for example, a camera or a camcorder, through the external device interface 210 to be output through the display 212 or the audio output unit 215 according to an external device video reproduction command received through the user interface 208.

The controller 206 may control the display 212 to display an image. For example, the controller may control a broadcast image input through the tuner 200, an external input image input through the external device interface 210, an image input through a network interface 204, or an image stored in the memory 214 to be displayed on the display 212.

At this time, the image displayed on the display 212 may be a still image, a moving image, a 2D image or a 3D image.

The controller 206 generates and displays a predetermined object in the image displayed on the display 212 as a 3D object. For example, the object may be at least one of a connected web screen (newspaper, magazine, or the like), an Electronic Program Guide (EPG), various menus, a widget, an icon, a still image, a moving image, or text.

The controller 206 provides a table indicating a relationship between gestures and commands corresponding thereto to the gesture recognition information memory 110 of the interface apparatus 10. The controller 206 provides information regarding the type of a program or content to the camera controller 106. In addition, the controller 206 may directly determine the gesture recognition mode based on the information regarding the type of the program or content and provide the gesture recognition mode to the controller 106.

The display 212 converts a video signal, a data signal, an OSD signal or a control signal processed by the controller 206 or a video signal, data signal or a control signal received through the external device interface 210 and generates a drive signal.

The display 212 may include a Plasma Display Panel (PDP), a Liquid Crystal Display (LCD), an Organic Light Emitting Diode (OLED) display, and a flexible display, which are capable of displaying a 3D image.

In the embodiment of the present invention, for 3D image viewing, the display 212 may be divided into a supplementary display type and a single display type.

The display 212 may include a touch screen and function as an input device as well as an output device.

The audio output unit 215 receives the audio signal processed by the controller 206, for example, a stereo signal, a 3.1 channel signal or a 5.1 channel signal, and outputs audio. The audio output unit 215 may be implemented by various types of speakers.

The content display apparatus 20 may be a fixed digital broadcast receiver capable of receiving at least one of an ATSC (8-VSB) digital broadcast, a DVB-T (COFDM) digital broadcast, or an ISDB-T (BST-OFDM) digital broadcast or a mobile digital broadcast receiver capable of receiving at least one of a terrestrial DMB digital broadcast, a satellite DMB digital broadcast, an ATSC-M/H digital broadcast, a DVB-H (COFDM) digital broadcast or a Media Forward Link Only digital broadcast. In addition, the content display apparatus 20 may be a cable, satellite or IPTV digital broadcast receiver.

The content display apparatus 20 shown in FIG. 2 is only exemplary and the components may be combined, added or omitted according to the type of the content display apparatus. That is, two or more components may be combined into one component or one component may be divided into two or more components, as necessary. The functions of the blocks are purely exemplary and do not limit the scope of the present invention.

Figure 13:
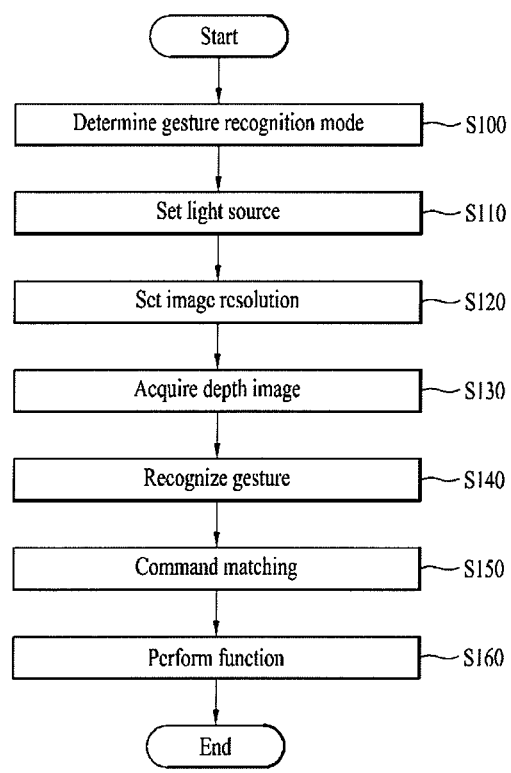
FIG. 13 is a flowchart illustrating a gesture-based user interface method according to the first embodiment of the present invention.

Hereinafter, the gesture-based user interface method according to the first embodiment of the present invention using the above-described user interface apparatus 10 will be described in detail. FIG. 13 is a flowchart illustrating the gesture-based user interface method according to the first embodiment of the present invention.

First, a gesture recognition mode of a user is determined (S100). The gesture recognition mode may be divided into a first mode for recognizing a whole-body gesture and a second mode for recognizing a gesture involving only a part of the body. The recognition range of the second mode is narrower than that of the first mode.

For example, as shown in FIG. 4, if content which is being reproduced by the content display apparatus 20, such as TV broadcasts, movies or e-books, does not require a complicated operation in terms of control, the gesture recognition mode may be set to the first mode. Since the first mode requires relatively simple control such as page turning, channel change or volume change, as shown in FIG. 5, the user may control the content display apparatus 20 using a relatively large gesture in the first mode.

As shown in FIG. 6, if content which is being reproduced by the content display apparatus 20, such as html documents used in a PC or games, requires accurate operation in terms of control, the gesture recognition mode may be set to the second mode. Since the second mode requires accurate complicated commands such as selection, clicking and copying of a displayed object such as text, as shown in FIG. 6, the user can control the content display apparatus 20 using a relatively small accurate gesture such as movement of a finger in the second mode. At this time, the gesture recognition mode may be divided into 3 or more gesture recognition modes according to content characteristics.

If the user is separated from the interface apparatus 10 by a relatively small distance $d_1$ as shown in FIG. 11, the camera controller 106 sets the gesture recognition mode to the short distance mode and, if the user is separated from the interface apparatus 10 by a relatively large distance $d_2$ as shown in FIG. 12, the camera controller 106 sets the gesture recognition mode to the long distance mode.

Next, conditions of the light source are set according to the gesture recognition mode (S110). That is, at least one of optical wavelength, optical power level and frame rate is controlled according to the set gesture recognition mode.

In the set gesture recognition mode, the optical wavelength is set to a first wavelength in the first mode and the optical wavelength is set to a second wavelength shorter than the first wavelength in the second mode. For example, in the first mode which does not require accurate gesture recognition, a depth image may be acquired using the second light source 102 having a wavelength of 850 nm. In this case, by using the second light source 102 having the wavelength longer than that of the first light source 101, it is possible to reduce energy consumption. In contrast, in the second mode requiring accurate gesture recognition, a more accurate depth image may be acquired using the first light source 100 having a wavelength of 780 nm.

The light source may be controlled such that the frame rate is set to a first frame rate in the first mode and the frame rate is set to a second frame rate that is greater than the first frame rate. For example, in the first mode which does not require accurate gesture recognition, light is irradiated at a frame rate of 15 fps so as to acquire a depth image. In contrast, in the second mode which requires accurate gesture recognition, light is irradiated at a frame rate of 60 fps so as to acquire a more accurate depth image.

If the gesture recognition mode is divided into a short distance mode and a long distance mode as described above, the optical power level is set to a first power value in the short distance mode and the optical power level is set to a second power value greater than the first power value in the long distance mode. In the short distance mode, the light source is set to have a relatively low power level so as to reduce power consumption. In contrast, in the long distance mode, the light source is set to have a relatively high power level so as to increase the gesture recognition rate.

For example, the camera controller 106 sets the power level of the light source to 200 Lux in the short distance mode and sets the power level of the light source to 800 Lux in the long distance mode so as to increase recognition range.

Next, the resolution of the depth image is set according to the gesture recognition mode (S120). That is, the resolution of the depth image is set to a first resolution in the first mode and the resolution of the depth image is set to a second resolution higher than the first resolution in the second mode. Thus, in the first mode, the gesture can be more rapidly recognized by reducing the output data amount of the depth image.

FIGS. 8 to 10 show examples of depth images having different resolutions. FIG. 8 shows a depth image having a VGA resolution (640×480), FIG. 9 shows a depth image having a QVGA resolution (320×240), and FIG. 10 shows a depth image having a QQVGA resolution (160×120).

For example, the camera controller 106 may control the image sensor 104 to output a depth image having a low resolution of QQVGA (160×120) to the image processor 108 in the first mode which does not require accurate gesture recognition. In contrast, the camera controller 106 may control the image sensor 104 to output a depth image having a high resolution of VGA (640×480) in the second mode requiring accurate gesture recognition. If the gesture recognition mode is divided into three modes according to program characteristics, it is possible to respectively set resolutions according to the modes.

Next, light is irradiated to the user, the light reflected from the user is received by the image sensor 104, and the depth image is acquired (S130). The image sensor 104 receives the light reflected from the user and generates and outputs the depth image of the user. As described above, the depth image may be generated using a time of flight (TOF) method or a structured light method.

Next, the user gesture is recognized based on the depth image using the image processor (S140). For example, at least one object having a peak value is detected from a first depth image acquired by the image sensor 104. In order to detect the peak value, various methods may be used.

More specifically, a mean m and an average absolute deviation $\sigma$ of pixel values may be computed in the depth image. A median and an average absolute deviation from the median may be used as the mean and the average absolute deviation. It is possible to generate a binary image having the same size, in which a value of 1 is allocated to all pixels having a depth value higher than a threshold (m+K$\sigma$) and a value of 0 is allocated to the other pixels. K may vary according to noise levels and the number of objects in the image. In the binary image, connected components may be identified as one object and a unique ID may be applied thereto.

Similarly, at least one object having a peak value is detected from a second depth image. The coordinate of at least one object extracted from the second depth image is compared with the coordinate of at least one object extracted from the first depth image and at least one object having a changed coordinate is set as a target object.

By comparison between the two depth images, a mobile object is set as a target object and a stationary object is not set as a target object. Accordingly, a mobile user's hand and a stationary object are distinguished and the mobile user's hand is set as a target object.

At least one object set as the target object may be used as an input unit of the user interface. For example, the user may input a gesture using the target object. The input gesture is analyzed.

Next, a control command corresponding to the recognized user gesture is output (S150). That is, if the user moves a body part set as a target object, the movement of the body part may be photographed using the light source and the image sensor 104, the photographed depth image may be analyzed, and a pointer displayed on the content display apparatus 20 may be moved. In addition to the movement of the pointer, various functions of the content display apparatus, such as channel up/down or volume up/down may be performed.

At this time, a command table in which gestures of a specific user are mapped to commands corresponding thereto may be stored. A command corresponding to the user gesture may be output based on the command table. At this time, a mapping relationship between the command defined in the command table and the gesture may be arbitrarily set by the user.

Next, the function corresponding to the control command is performed with respect to the content display apparatus 20 (S160).

Figure 14:
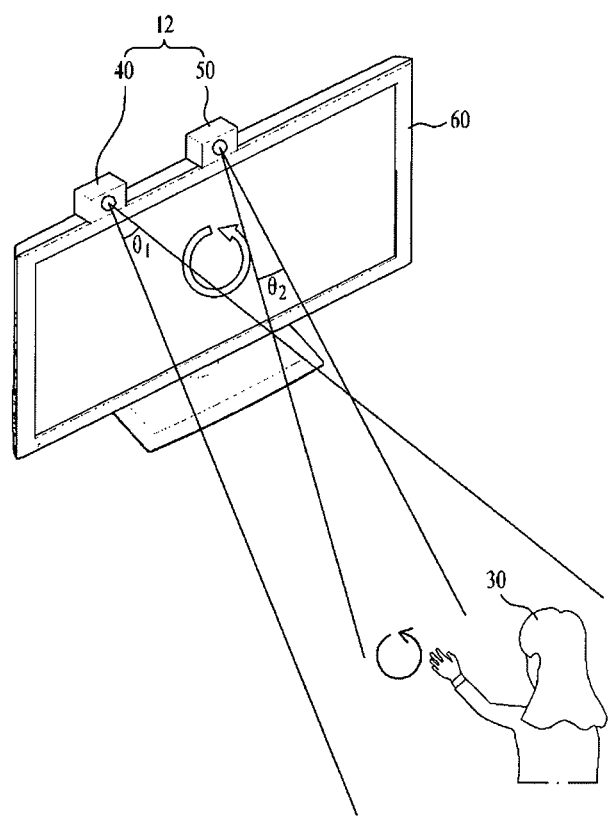
FIG. 14 is a schematic diagram showing a first example of using a gesture-based user interface apparatus according to a second embodiment of the present invention.

Hereinafter, a gesture-based user interface apparatus 12 and method according to a second embodiment of the present invention will be described. FIG. 14 is a schematic diagram showing an example of using the gesture-based user interface apparatus 12 according to the second embodiment of the present invention.

As shown in FIG. 14, the interface apparatus 12 according to the present embodiment is connected to a content display apparatus 60 and is positioned so as to capture a user gesture. At this time, the interface apparatus 12 recognizes a gesture from a user image using two depth cameras 40 and 50, converts the gesture into a command for controlling the content display apparatus 60, and enables the content display apparatus to perform a function desired by the user.

A first depth camera 50 may be a zoom camera for accurately photographing the user gesture and a second depth camera 40 may be a wide angle camera for photographing a region wider than that of the first depth camera 50.

The first depth camera 50 may be a TOF type camera and the second depth camera 40 may be a structured light type camera according to the method of acquiring a depth image.

In this case, one or both of the first depth camera 50 and the second depth camera 40 may be used according to the above-described gesture recognition mode.

Figure 15:
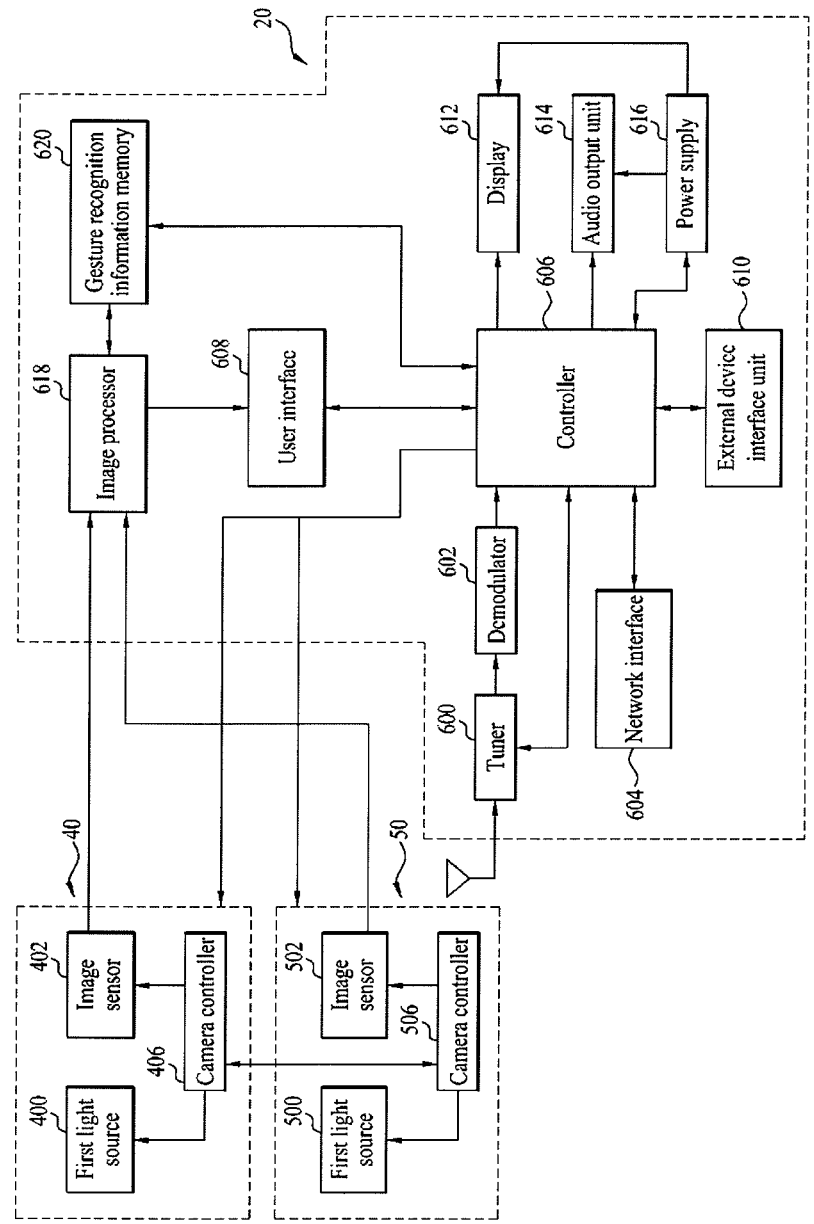
FIG. 15 is a block diagram of the gesture-based user interface apparatus and a content display apparatus according to the second embodiment of the present invention.

FIG. 15 is a block diagram of the gesture-based user interface apparatus 12 and the content display apparatus 60 according to the second embodiment of the present invention. As shown in FIG. 15, the interface apparatus 12 according to the present embodiment includes the first depth camera 50 and the second depth camera 40.

The first depth camera 50 and the second depth camera 40 include light sources 400 and 500 for irradiating light to the user and image sensors 402 and 502 for receiving the light reflected from the user, converting the light into depth images and outputting the depth images, respectively.

If the first depth camera 50 and the second depth camera 40 are simultaneously used, the lights output from the light sources 400 and 500 interfere with each other. Accordingly, in order to prevent such interference, optical power output timings of the first depth camera 50 and the second depth camera 40 may be adjusted through communication therebetween.

In FIG. 15, unlike FIG. 2, an image processor 618 and a gesture recognition information memory 620 are included in the content display apparatus 60 so as to perform the function. However, alternatively, the image processor 618 and the gesture recognition information memory 620 may be included in the first depth camera 50 and the second depth camera 40, respectively.

As the functions and the configurations of the light sources 400 and 500, the image sensors 402 and 502, the camera controllers 406 and 506, the image processor 618, the gesture recognition information memory 620 and the components included in the content display apparatus 60 are equal to those of the first embodiment, a detailed description thereof will be omitted.

The controller 606 of the content display apparatus 60 selects at least one of the first depth camera 50 and the second depth camera 40 according to the gesture recognition mode.

As described in the first embodiment, the gesture recognition mode may be divided into a first mode for recognizing a whole-body gesture and a second mode for recognizing a gesture involving only a part of the body. The recognition range of the second mode is narrower than that of the first mode.

The controller 606 of the content display apparatus 60 may set the gesture recognition mode to the first mode or the second mode according to information regarding the type of a program or content which is being reproduced. In addition, the controller 606 may set the gesture recognition mode to a third mode according to content characteristics. The controller 606 may set a camera to be used according to the gesture recognition mode.

For example, the controller 606 may control only the second depth camera 40 which is the wide angle camera to be used in the first mode and control only the first depth camera 50 which is the zoom camera to be used in the second mode. In a specific case, the two cameras may be simultaneously used in the third mode, thereby acquiring a more accurate depth image.

The function of the controller 606 may be performed by a control device (not shown) provided to the interface apparatus 12 separately from the content display apparatus 60.

Figure 16:
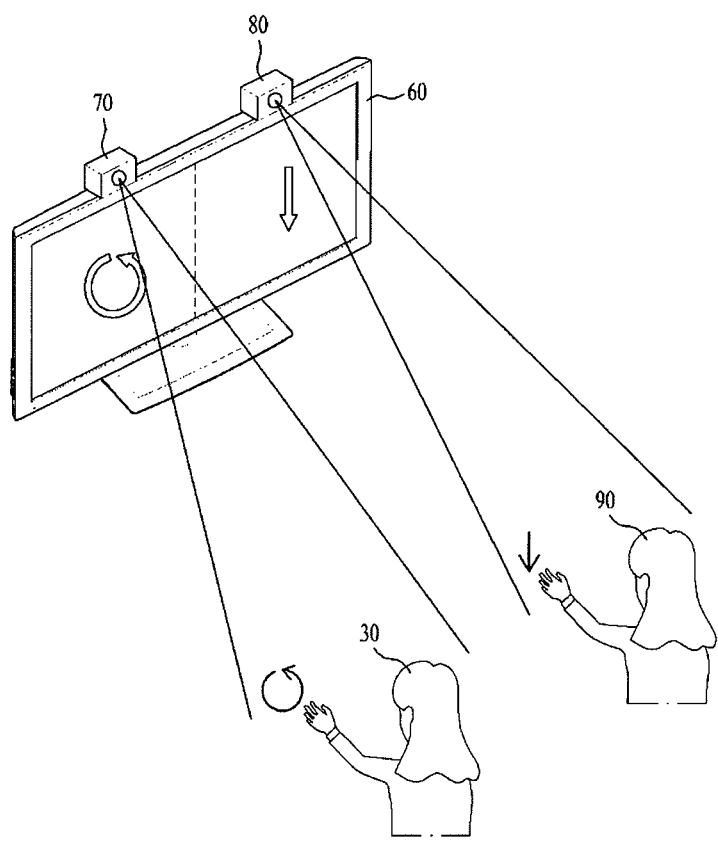
FIG. 16 is a schematic diagram showing a second example of using the gesture-based user interface apparatus according to the second embodiment of the present invention.

FIG. 16 is a schematic diagram showing a second example of using the gesture-based user interface apparatus 12 according to the second embodiment of the present invention. As shown in FIG. 16, if two or more users use the content display apparatus 60, the first depth camera 70 and the second depth camera 80 are configured to recognize gestures of different users.

As shown, a first user 30 inputs a gesture using the first depth camera 70 and a second user 90 inputs a gesture using the second depth camera 80. In this case, the users 30 and 90 can acquire control rights for the depth cameras 70 and 80 using specific operations. Each camera recognizes only the user gesture having the control rights and outputs a control command corresponding thereto. Accordingly, it is possible to prevent the first depth camera 70 and the second depth camera 80 from respectively recognizing the gestures of the users without the control rights.

Figure 17:
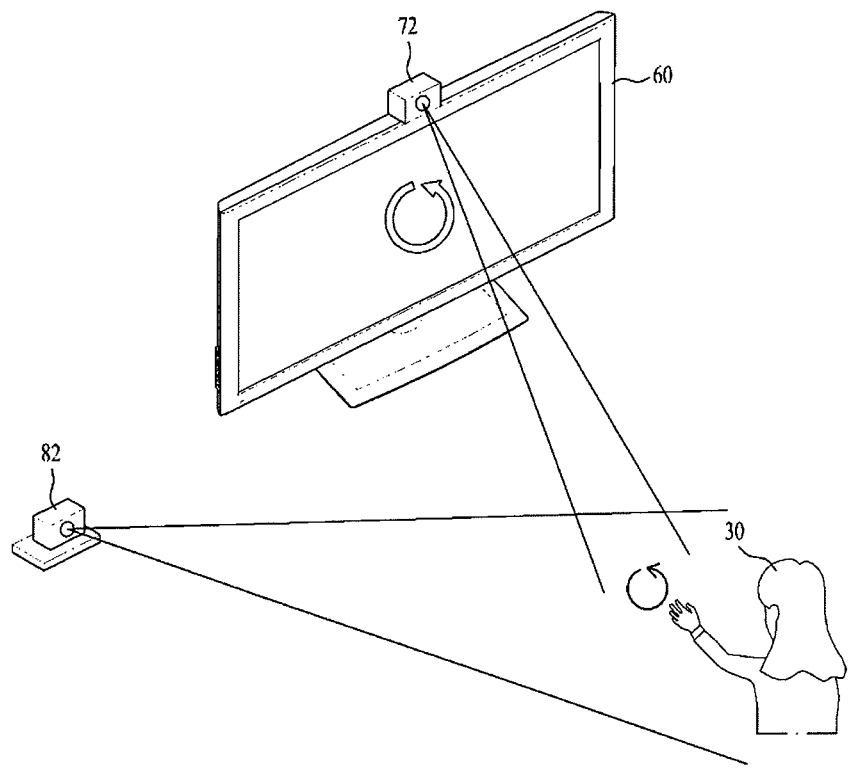
FIG. 17 is a schematic diagram showing a third example of using the gesture-based user interface apparatus according to the second embodiment of the present invention.

FIG. 17 is a schematic diagram showing a third example of using the gesture-based user interface apparatus 12 according to the second embodiment of the present invention. As shown in FIG. 17, a first depth camera 72 is disposed to photograph an image at a front side of the user and a second depth camera 82 is disposed to photograph an image at a position different from the front side of the user. The second depth camera 82 may be a movable camera in order to provide various images in addition to the front image of the user. In this case, the controller 606 may control one or both of the first depth camera 72 and the second depth camera 82 to be used according to the above-described gesture recognition mode.

Figure 18:
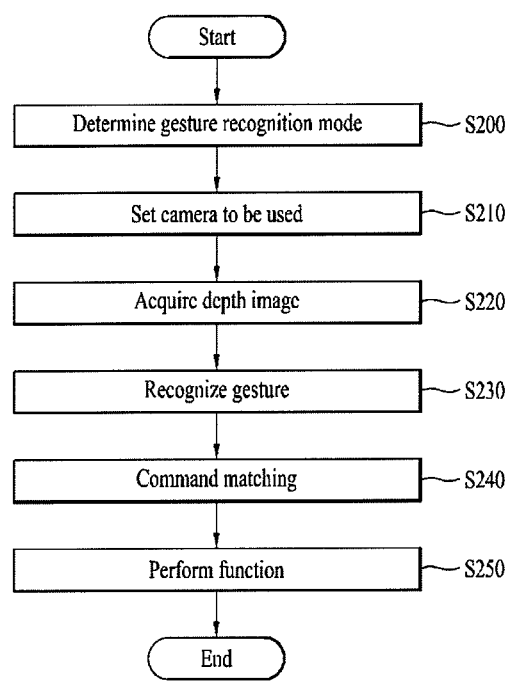
FIG. 18 is a flowchart illustrating a gesture-based user interface method according to the second embodiment of the present invention.

FIG. 18 is a flowchart illustrating the gesture-based user interface method according to the second embodiment of the present invention.

First, the gesture recognition mode of the user is determined (S200). As described above, the gesture recognition mode may be divided into a first mode for recognizing a whole-body gesture and a second mode for recognizing a gesture involving only a part of the body. The recognition range of the second mode is narrower than that of the first mode. A third mode may be added according to the characteristics of content to be reproduced.

Next, at least one of the first depth camera and the second depth camera is selected according to the gesture recognition mode (S210). For example, only the second depth camera which is the wide angle camera is used in the first mode and only the first depth camera which is the zoom camera is used in the second mode. In a specific case, two cameras may be simultaneously used in the third mode, thereby acquiring a more accurate depth image.

As shown in FIG. 16, if two or more users use the content display apparatus 60, both the first depth camera 70 and the second depth camera 80 may be used.

As shown in FIG. 17, if the first depth camera 72 is disposed to photograph the image at the front side of the user and the second depth camera 82 is disposed to photograph the image at the position different from the front side of the user, one or both of the first depth camera 72 and the second depth camera 82 may be used according to the above-described gesture recognition mode.

Next, light is irradiated to the user, the light reflected from the user is received by the image sensor and the depth image is acquired (S220). The user gesture is recognized based on the depth image using the image processor (S230), the control command corresponding to the recognized user gesture is output (S240), and the function corresponding to the control command is performed with respect to the content display apparatus (S250). A detailed description of the above-described steps is equal to that of the first embodiment and a description thereof will be omitted.

According to the present invention, it is possible to more accurately and efficiently recognize a user gesture according to conditions such as the type of a program or content provided by a content display apparatus or the position of the user.

It is possible to minimize power consumption when recognizing a user gesture.

It is possible to minimize capacity of data transmitted and received when recognizing a user gesture so as to more rapidly recognize the user gesture.

It is possible to more accurately recognize a user gesture using two or more camera devices.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An apparatus configured to recognize a gesture, comprising:
   a light source configured to irradiate light;
   an image sensor configured to:
      receive a portion of the light that is reflected from a user,
      convert the received light into a depth image of the user, and
      output the depth image;
   an image processor configured to recognize the gesture of the user based on the depth image;
   a controller configured to control the light source, the image sensor and the image processor,
   wherein the controller is further configured to:
      decide a gesture recognition mode based on at least one of a range of the recognized gesture and accuracy of the recognized gesture,
   wherein at least one of an optical wavelength of the light source, an optical power level of the light source and a resolution of the image sensor is controlled to change at least one of the range of the recognized gesture and the accuracy of the recognized gesture of the decided gestured recognition mode,
   wherein the gesture recognition mode includes a first mode for recognizing a whole-body gesture and a second mode for recognizing a gesture involving a part of the body,
   wherein a recognition range of the second mode is narrower than a recognition range of the first mode,
   wherein if the controller controls the frame rate in the first mode, the frame rate is set to a first frame rate,
   wherein if the controller controls the frame rate in the second mode, the frame rate is set to a second frame rate, and
   wherein the second frame rate is greater than the first frame rate.

2. The apparatus of claim 1, wherein if the controller controls the optical wavelength in the first mode, the optical wavelength is set to a first wavelength,
   wherein if the controller controls the optical wavelength in the second mode, the optical wavelength is set to a second wavelength, and
   wherein the second wavelength is shorter than the first wavelength.

3. An apparatus configured to recognize a gesture, comprising:
   a light source configured to irradiate light;
   an image sensor configured to:
      receive a portion of the light that is reflected from a user,
      convert the received light into a depth image of the user, and
      output the depth image;
   an image processor configured to recognize the gesture of the user based on the depth image;
   a controller configured to control the light source, the image sensor and the image processor,
   wherein the controller is further configured to:
      decide a gesture recognition mode based on at least one of a range of the recognized gesture and accuracy of the recognized gesture,
   wherein at least one of an optical wavelength of the light source, an optical power level of the light source and a resolution of the image sensor is controlled to change at least one of the range of the recognized gesture and the accuracy of the recognized gesture of the decided gestured recognition mode,
   wherein the gesture recognition mode includes a first mode for recognizing a whole-body gesture and a second mode for recognizing a gesture involving a part of the body,
   wherein a recognition range of the second mode is narrower than a recognition range of the first mode,
   wherein if the controller controls the resolution of the depth image, the resolution of the depth image is set to a first resolution,
   wherein if the controller controls the resolution of the depth image, the resolution of the depth image is set to a second resolution, and
   wherein the second resolution is higher than the first resolution.

4. The apparatus of claim 1,
   wherein the gesture recognition mode includes;
      a short distance mode in which a distance between the apparatus and the user is less than a reference distance, and
      a long distance mode in which the distance is greater than the reference distance,
   wherein the controller is further configured to set the optical power level to a first power value in the short distance mode and set the optical power level to a second power value in the long distance mode, and
   wherein the second power value is greater than the first power value.

5. The apparatus of claim 1, further comprising:
   a memory configured to store information regarding a command corresponding to the recognized gesture of the user,
   wherein if the controller recognizes the gesture of the user, the controller is configured to output the command to a content display apparatus based on the information corresponding to the command.

6. A method of recognizing a gesture by an apparatus having a light source, an image sensor and an image processor, the method comprising:
   deciding a gesture recognition mode based on at least one of a range of the recognized gesture and accuracy of the recognized gesture, and
   controlling an operation of the apparatus according to the gesture recognition mode, the gesture recognition mode including settings for controlling at least one of an optical wavelength of the light source, an optical power level of the light source, a frame rate of the light source and an image resolution of the image sensor to change at least one of the range of the recognized gesture and the accuracy of the recognized gesture,
   wherein the operation of the apparatus includes
   irradiating light by the light source;
   receiving a portion of the light that is reflected from a user;
   converting the received light into a depth image of the user by the image sensor;
   outputting the depth image; and
   recognizing the gesture of the user based on the depth image,
   wherein the gesture recognition mode includes a first mode for recognizing a whole-body gesture and a second mode for recognizing a gesture involving only a part of the body, wherein a recognition range of the second mode is narrower than a recognition range of the first mode, wherein the step of controlling includes setting the frame rate to a first frame rate in the first mode and setting the frame rate to a second frame rate in the second mode, and wherein the second frame rate is greater than the first frame rate.

7. The method of claim 6, wherein the step of controlling includes setting the optical wavelength a first wavelength in the first mode and setting the optical wavelength to a second wavelength in the second mode, and wherein the second wavelength is shorter than the first wavelength.

8. A method of recognizing a gesture by an apparatus having a light source, an image sensor and an image processor, the method comprising:

deciding a gesture recognition mode based on at least one of a range of the recognized gesture and accuracy of the recognized gesture, and controlling an operation of the apparatus according to the gesture recognition mode, the gesture recognition mode including settings for controlling at least one of an optical wavelength of the light source, an optical power level of the light source, a frame rate of the light source and an image resolution of the image sensor to change at least one of the range of the recognized gesture and the accuracy of the recognized gesture, wherein the operation of the apparatus includes irradiating light by the light source;

receiving a portion of the light that is reflected from a user;

converting the received light into a depth image of the user by the image sensor;

outputting the depth image; and recognizing the gesture of the user based on the depth image wherein the gesture recognition mode includes a first mode for recognizing a whole-body gesture and a second mode for recognizing a gesture involving only a part of the body, and wherein a recognition range of the second mode is narrower than a recognition range of the first mode, wherein the step of controlling includes setting the image resolution to a first resolution in the first mode and setting the image resolution to a second resolution in the second mode, and wherein the second resolution is higher than the first resolution.

9. The method of claim 6, wherein the gesture recognition mode includes a short distance mode in which a distance between the apparatus and the user is less than a reference distance and a long distance mode in which the distance is greater than the reference distance, wherein the step of controlling includes setting the optical power level to a first power value in the short distance mode and setting the optical power level is set to a second power value in the long distance mode, and wherein the second power level is greater than the first power value.

10. The method of claim 6, further comprising:

storing information regarding a command corresponding to the recognized gesture of the user; and outputting the command corresponding to the recognized gesture of the user to a content display apparatus based on the information regarding the command.

* * * * *